(12) United States Patent
Kley et al.

(10) Patent No.: US 10,308,133 B2
(45) Date of Patent: Jun. 4, 2019

(54) SUPERCONDUCTING POWER AND TRANSPORT SYSTEM

(71) Applicant: Metadigm LLC, Berkeley, CA (US)

(72) Inventors: Victor B. Kley, Berkeley, CA (US); Melvin J. Bulman, Fair Oaks, CA (US)

(*) Notice: Subject to any disclaimer, the term of this patent is extended or adjusted under 35 U.S.C. 154(b) by 200 days.

(21) Appl. No.: 15/140,231

(22) Filed: Apr. 27, 2016

(65) Prior Publication Data

US 2017/0080823 A1 Mar. 23, 2017

Related U.S. Application Data

(63) Continuation of application No. 13/125,288, filed as application No. PCT/US2009/061340 on Oct. 20, 2009.

(60) Provisional application No. 61/106,970, filed on Oct. 20, 2008.

(51) Int. Cl.
| | |
|---|---|
| *B60L 13/10* | (2006.01) |
| *B61B 13/10* | (2006.01) |
| *B61B 13/08* | (2006.01) |
| *G06Q 50/16* | (2012.01) |
| *B61B 1/00* | (2006.01) |
| *B61C 3/00* | (2006.01) |
| *B61K 13/00* | (2006.01) |

(52) U.S. Cl.
CPC ............. *B60L 13/10* (2013.01); *B61B 1/00* (2013.01); *B61B 13/08* (2013.01); *B61B 13/10* (2013.01); *B61C 3/00* (2013.01); *B61K 13/00* (2013.01); *G06Q 50/165* (2013.01); *B60L 2200/26* (2013.01); *Y02T 30/30* (2013.01)

(58) Field of Classification Search
CPC ......... B60L 13/10; B61B 13/08; B61B 13/10; B61B 1/00
See application file for complete search history.

(56) References Cited

U.S. PATENT DOCUMENTS

| | | | |
|---|---|---|---|
| 1,216,694 A | 2/1917 | Jenkins | |
| 1,336,732 A | 4/1920 | Ballard | |
| 2,488,287 A | 11/1949 | Goddard | |
| 3,738,281 A | 6/1973 | Waidelich | |
| 3,947,622 A | 3/1976 | Graneau | |
| 3,954,064 A * | 5/1976 | Minovitch | ............ B60L 13/006 104/138.1 |

(Continued)

FOREIGN PATENT DOCUMENTS

| | | | |
|---|---|---|---|
| EP | 1829761 | | 9/2007 |
| GB | 2 160 941 | * | 1/1986 |

(Continued)

OTHER PUBLICATIONS

U.S. Appl. No. 13/125,288, Non-Final Office Action dated Mar. 11, 2013, 10 Pages.

(Continued)

*Primary Examiner* — Mark T Le
(74) *Attorney, Agent, or Firm* — Kilpatrick Townsend & Stockton LLP (57) ABSTRACT

A transport and power system having a plurality of tubes or tunnels, a magnetic levitation and linear motor train, and a superconducting power cable. One of the tubes can be an escape, power distribution, and maintenance tunnel. These tubes can be above ground, below ground, at ground, or under water.

21 Claims, 11 Drawing Sheets

(56) References Cited

U.S. PATENT DOCUMENTS

| | | | |
|---|---|---|---|
| 4,075,948 | A | 2/1978 | Minovitch |
| 4,113,202 | A | 9/1978 | Ueno |
| 4,841,869 | A | 6/1989 | Takeuchi et al. |
| 4,947,007 | A * | 8/1990 | Dew .................... H02G 15/34 174/15.4 |
| 5,433,155 | A | 7/1995 | O'neill et al. |
| 5,605,100 | A | 2/1997 | Morris et al. |
| 5,653,174 | A * | 8/1997 | Halus .................... B61B 13/08 104/112 |
| 5,653,175 | A * | 8/1997 | Milligan ................ B60L 13/04 104/138.1 |
| 6,262,375 | B1 | 7/2001 | Engelhardt et al. |
| 6,374,746 | B1 | 4/2002 | Fiske |
| 6,418,857 | B1 * | 7/2002 | Okano .................... B60L 13/04 104/281 |
| 6,576,843 | B1 | 6/2003 | Ashworth |
| 7,191,710 | B2 | 3/2007 | Powell |
| 2010/0083864 | A1 * | 4/2010 | Flynn .................... B61B 13/10 104/138.1 |
| 2012/0089525 | A1 | 4/2012 | Kley et al. |

FOREIGN PATENT DOCUMENTS

| | | |
|---|---|---|
| RU | 2011120187 | 11/2012 |
| SU | 437266 | 7/1974 |
| WO | 2010048194 A2 | 4/2010 |
| WO | 2010048194 A3 | 7/2010 |

OTHER PUBLICATIONS

U.S. Appl. No. 13/125,288, Final Office Action dated Sep. 27, 2013, 10 pages.
U.S. Appl. No. 13/125,288, Final Office Action dated Mar. 31, 2015, 11 pages.
U.S. Appl. No. 13/125,288, Non-Final Office Action dated Oct. 14, 2014, 9 Pages.
International Application No. PCT/US2009/061340, International Search Report and Written Opinion dated May 18, 2010, 9 pages.
Russian Application No. 2011120187, Office Action dated May 7, 2014, 3 pages (English Translation).
Russian Application No. 2011120187, Office Action dated Jan. 15, 2014, 3 pages (English Translation).

* cited by examiner

FIG. 8A
Side View of Cargo and Seal Car

FIG. 8B
Side View of Seal Car (right) and Train car with load gate down and active seals preserving vacuum in tunnel

FIG. 9

SUPERCONDUCTING POWER AND TRANSPORT SYSTEM

CROSS REFERENCE TO RELATED APPLICATIONS

This application is a continuation of Ser. No. 13/125,288, filed Dec. 6, 2011, entitled "Superconducting Power and Transport System," which is a 371 Application of PCT/US09/61340, filed Oct. 20, 2009, entitled "Superconducting Power and Transport System," which claims the benefit of U.S. Patent Application No. 61/106,970 filed Oct. 20, 2008 for "Terraspan—a Superconducting Power and Transport System including Emergency Safety and Recovery Techniques" (inventor Victor B. Kley). The entire disclosures of the above applications are incorporated by reference for all purposes.

BACKGROUND AND SUMMARY OF THE INVENTION

The present invention relates generally to techniques, devices, processes, and methods for creating a superconducting power distribution system for the transmission of electrical power in which the available power is used to provide a levitating and translation field for the purpose of supporting one or more magnetically levitated and accelerated transport structures or train cars.

Heretofore there have been superconducting power distribution systems and vacuum based magnetically levitated systems for transporting, equipment, goods and people but all have suffered from a number of serious issues including the difficulty and cost of implementation and maintenance and the issue of safety with regard to high speed transit in a vacuum environment.

In an aspect of the invention, a system includes one or more tubes in which the air has been removed, thereby aiding cooling systems for superconducting power and eliminating air friction, which is the main source of energy loss in transport systems. The tubes can be located underground and/or underwater and/or at the surface and/or above ground. Underground tubes will sometimes be referred to as tunnels, but unless the context dictates otherwise, the terms "tunnel" and "tube" will be used somewhat interchangeably, and are intended to cover any of the above locations. The tubes can be level or sloped as dictated by the terrain or other functional requirements.

In another aspect of the invention, a safe transition mechanism is provided in the event of a loss of vacuum or power to a train in motion so that people and animals may safely leave the train and tunnels and reach or be rescued to the surface and ambient air.

In another aspect of the invention, air or other gases are pumped out of the tube by the motion of the train car which has had one or more close fitting sealing elements sealing against passage of air in the direction of its motion. The sealing elements can be passive or active in their action to seal against the walls of the tube. End sealing elements can be provided on train cars in tube sections set up to load and unload cars wherein the sealing elements create an air lock to the system.

In another aspect of the invention, the kinetic energy of the train is used to store and transfer electrical energy and simultaneously provide a constant store of goods and materials which have minimal access time to localities along the route of the train.

In another aspect of the invention, implementation costs are reduced by sharing the construction of the tubes, and integrating their respective infrastructures.

In another aspect of the invention, a subterranean right of way is established, for example by use of a limited eminent domain in order to provide incentive for formation of large capital pools to provide the deep and ongoing financing needed to construct the system. The parties providing capital obtain only the legal title to a particular subterranean volume while leaving the mineral, water, and surface rights unchanged, thus overcoming a major political hurdle of such a capitalization scheme. Some surface rights would also be granted to provide necessary infrastructure that by its nature needs to be above ground.

A further understanding of the nature and advantages of the present invention may be realized by reference to the remaining portions of the specification and the drawings.

DESCRIPTION OF SPECIFIC EMBODIMENTS

Overview of System Components

Figure 1A:
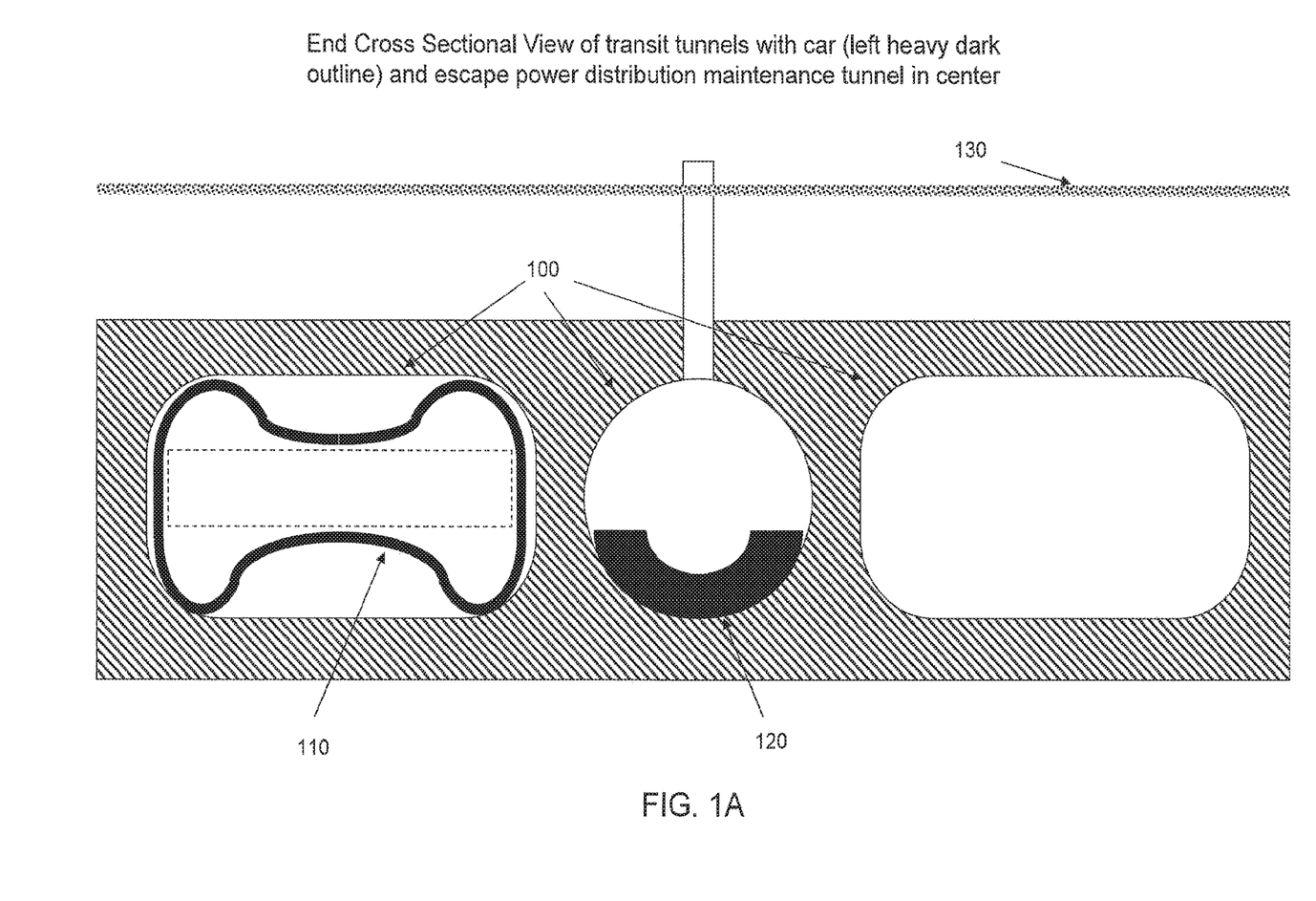
FIG. 1A is a cross section of the tunnels, train, and power cable in an embodiment of the present invention.

FIG. 1A is a cross-sectional view of a transport and power system having three tunnels 100, a magnetic levitation and linear motor train 110 (shown in the left tunnel as a heavy dark outline), and a superconducting power cable in an embodiment of the present invention. Different embodiments can have fewer or more (preferably parallel) tunnels. The center tunnel is shown as being an escape, power distribution, and maintenance tunnel. These tunnels are shown as below ground level 130, but other locations are possible.

Figure 1B:
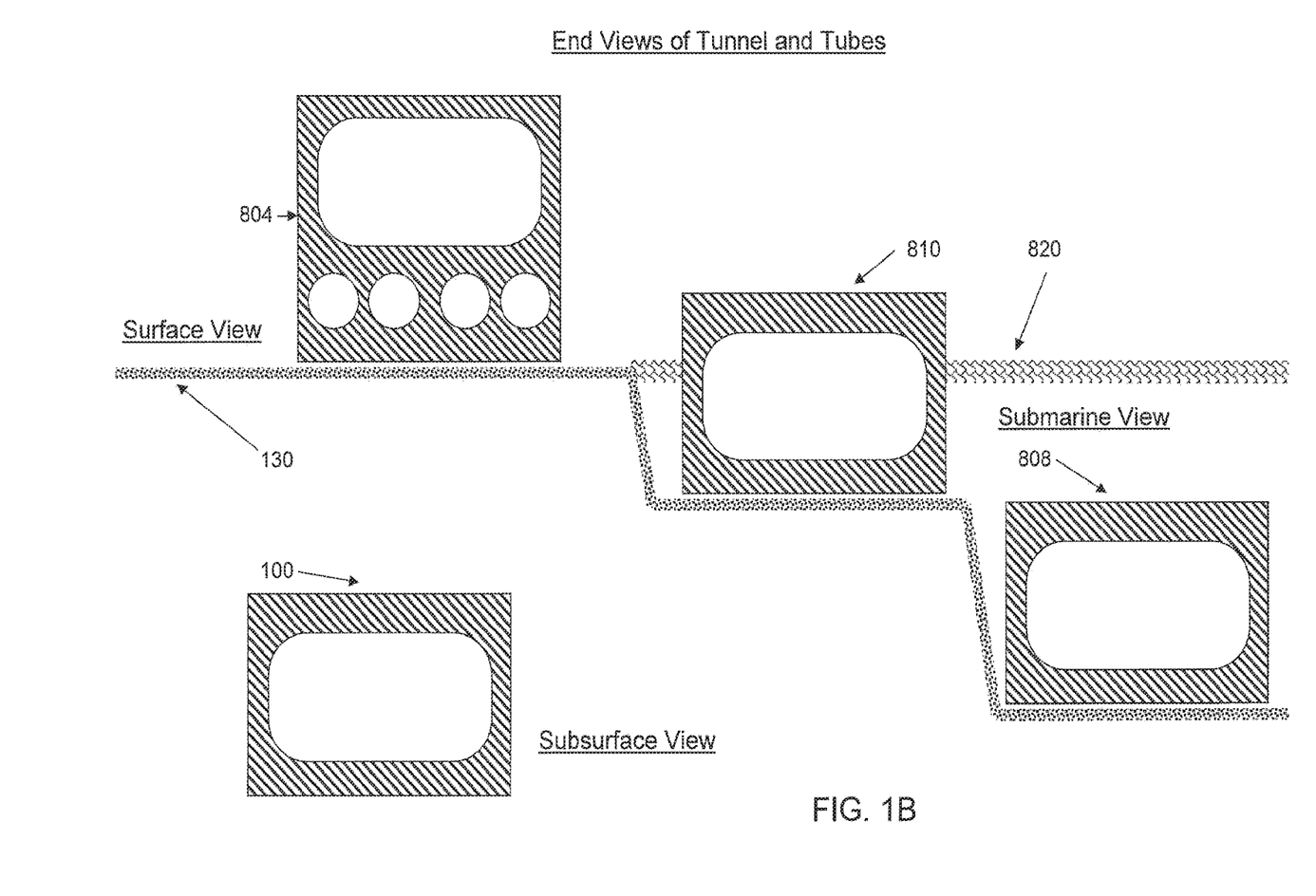
FIG. 1B provides cross-sectional views of a tunnel tube, an above ground tube, a partially submerged tube, and an underwater tube.

For example, FIG. 1B provides cross-sectional views of a tunnel tube 100, an above ground tube 804, a tube 810 partially submerged in water 820, and an underwater tube 808. Unless the context dictates otherwise, the terms "tunnel" and "tube" will be used interchangeably regardless of whether the tube is above ground, below ground, at ground, or under water. Underground tubes will often be referred to as tunnels.

The train or train cars follow the general design used in various locations around the world. Goddard's basic vacuum train U.S. Pat. Nos. 2,488,287, 1,336,732, 3,738,281, 4,075, 948, and 6,374,746 on related technology are incorporated by reference. The train cars have airflow surfaces along the long axis of the car such that at high speeds in air the car will be lifted within the tube and kept from direct contact with the tube walls. As will be described below, the cars can be provided with one or more sweeps or seals. In operation, introduction of air into the vacuum tube when the car is at high speed causes the sweep(s) or seal(s) to disintegrate in the lifting body areas and cause the car to behave as an airfoil in a tube.

The superconducting power line and support equipment are well known in the electrical power art. U.S. Pat. Nos. 3,947,622, 4,947,007, 6,262,375, and 6,576,843 on related technology are incorporated by reference. The tubes are vacuum capable enclosures for the trains/cars/power cables, and preferably are transcontinental east to west and north to south but may be oriented in any direction. Underground tunnels are formed by automatic earth boring machines and extend long distances. Since the tubes can be below ground, on or above ground, underwater, or partially above water, the system of FIG. 1A can connect any and all electrical generator sources along its route with all users along the same route. By interconnection between multiple systems most of the continents and peoples of the world may be interconnected for power distribution and transportation.

Figures 2A, 2B, 2C:
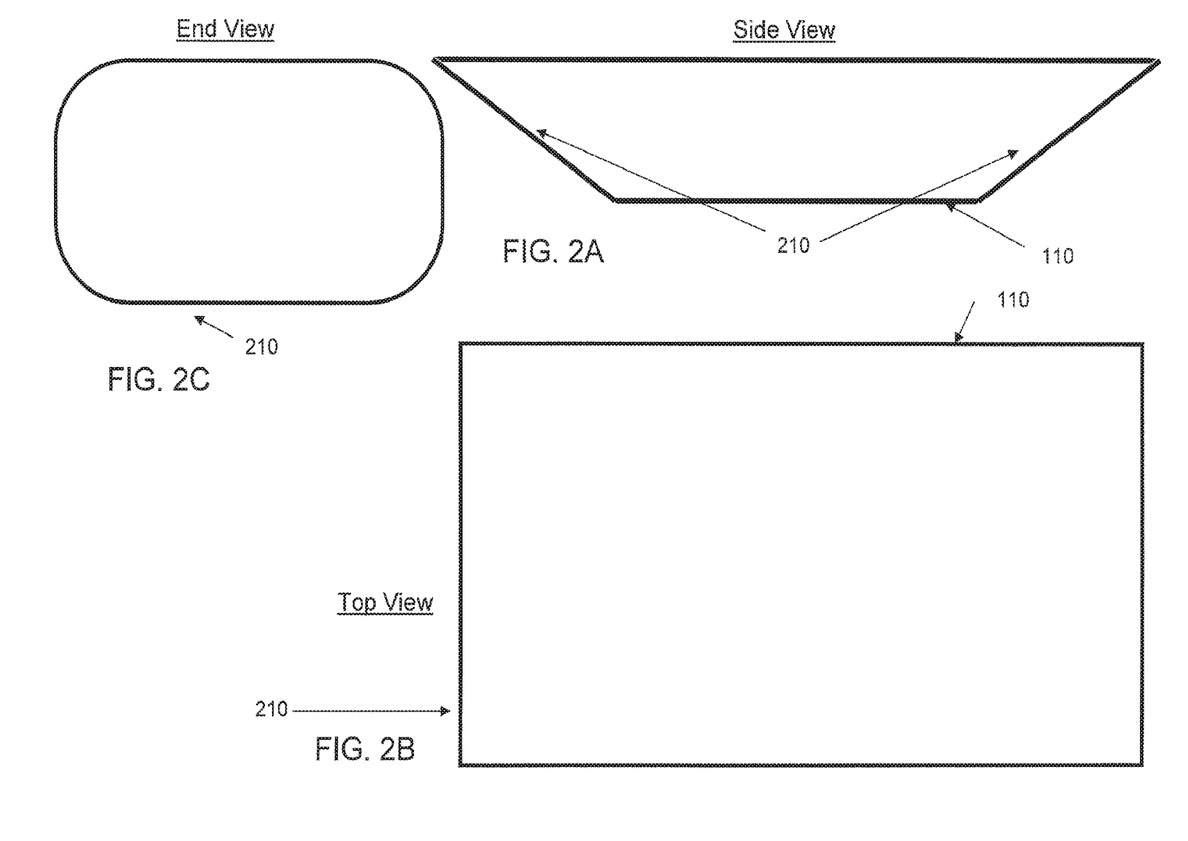
FIGS. 2A, 2B, and 2C are side, top, and end views of the train with the breakaway lifting body air remnant sweeps in place.

FIGS. 2A, 2B, and 2C are side, top, and end views of the train showing continuous removable and breakaway debris and/or air sweeps 210 which act to provide lift to the train car bodies 110 under low air pressure. However, they break away and decelerate (brake) the train under the force and thermal impact of near atmospheric pressure at high train speeds in the event of some interruption of the power which levitates the train cars or the rapid loss of vacuum for any reason in which the magnetic regenerative braking (deceleration) is unable to adequately slow the train.

Figure 3A:
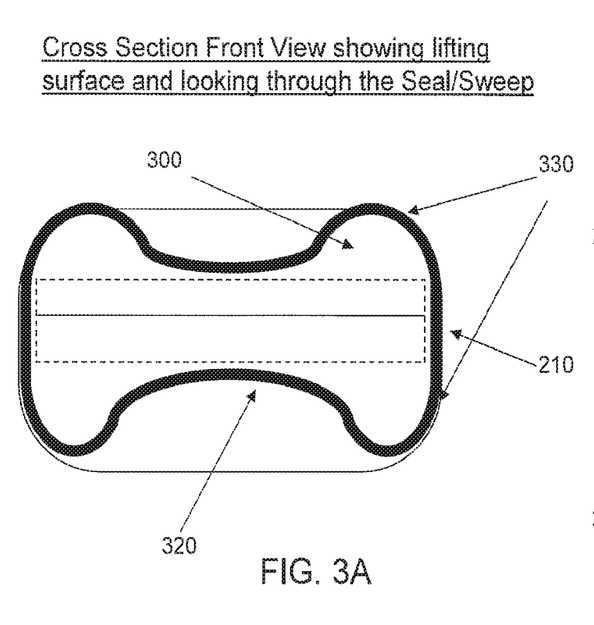
FIGS. 3A, 3B, and 3C are cross-sectional, front, and side views of the lifting body showing the ablative surfaces of the train in tunnel.
Figures 3B, 3C:
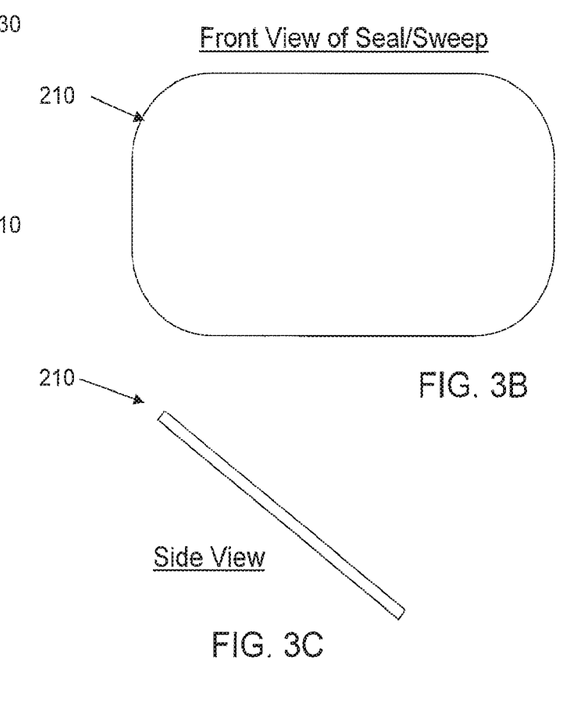

FIGS. 3A, 3B, and 3C are cross-section, front, and side views of the lifting body showing the ablative surfaces of the train in tunnel. In addition, the replaceable edges of the train car body 320 are designed to contact with the tunnel low-speed track to provide controlled deceleration as the train comes to a complete stop. This will be described in additional detail below with reference to FIG. 4B.

Figure 4A:
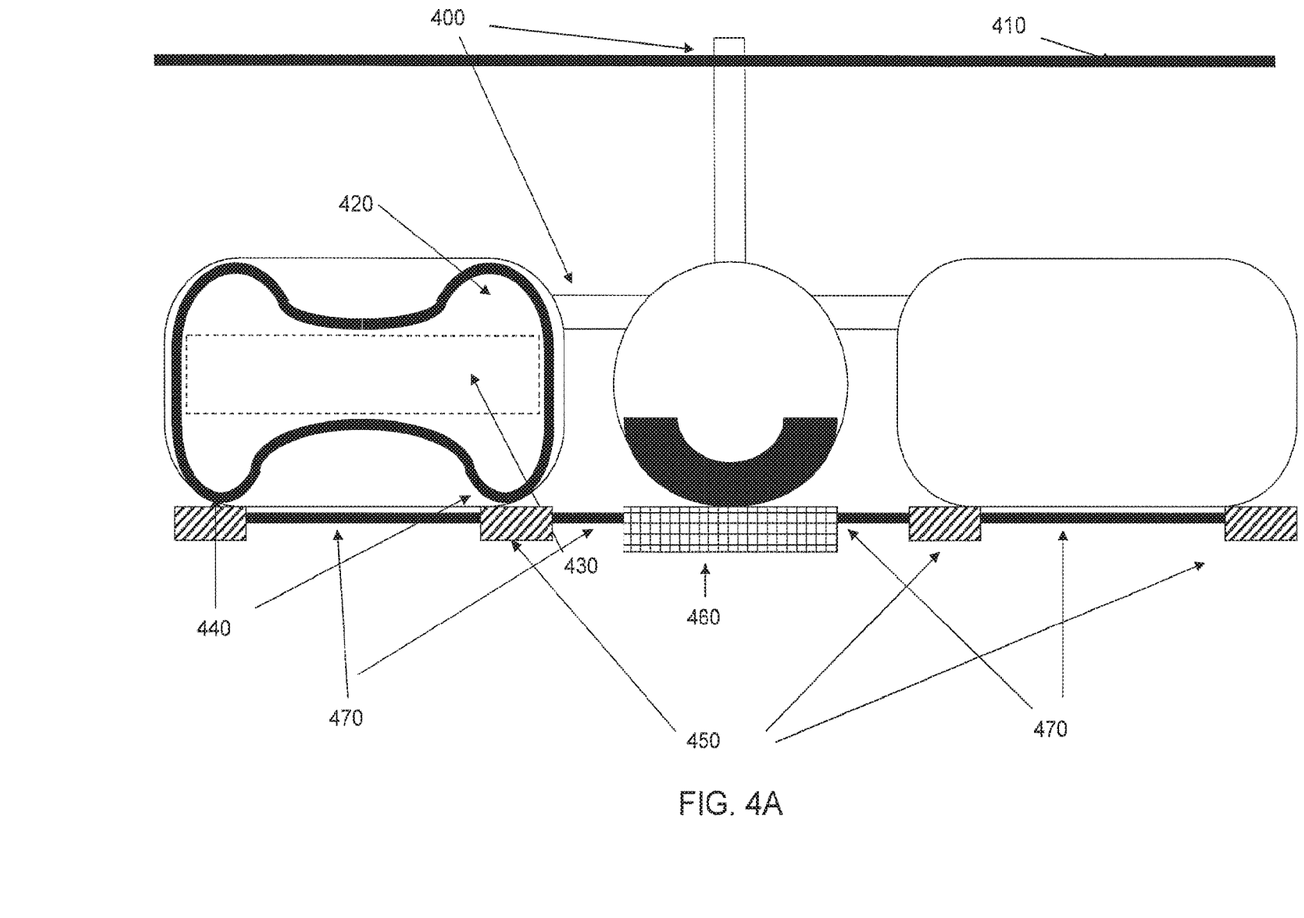
FIG. 4A is a side view showing a relief tunnel for automatic response to power out.

FIG. 4A is a side view showing a relief tunnel 400 for automatic response to power out. Tunnels 400 automatically unseal providing safe foot and wheelchair passage on ramps from the passenger compartments 420 to the surface within a few thousand meters of the train stop location (except in certain mountainous terrain). The sweeps and lifting body aerodynamic shape of the train car 320 in conjunction with air and escape tunnels 400 act to provide passengers a safe recovery from emergencies occurring when the train is at speed.

The train car includes passenger compartments 420, freight compartments 430, a power switching, cooling, levitation control and acceleration control system 460 connected by connection system 470 to the magnetic levitation and acceleration in tunnel modules 450. These magnetic levitation modules in the tunnel interact with the magnetic levitation system on each side of the train car itself 440. The train cars may be interconnected, may operate very close to each other but unconnected, or may operate with any amount of headroom or spacing between the cars. Actual operation is dynamic and changes according to load, power, and other issues.

Figure 4B:
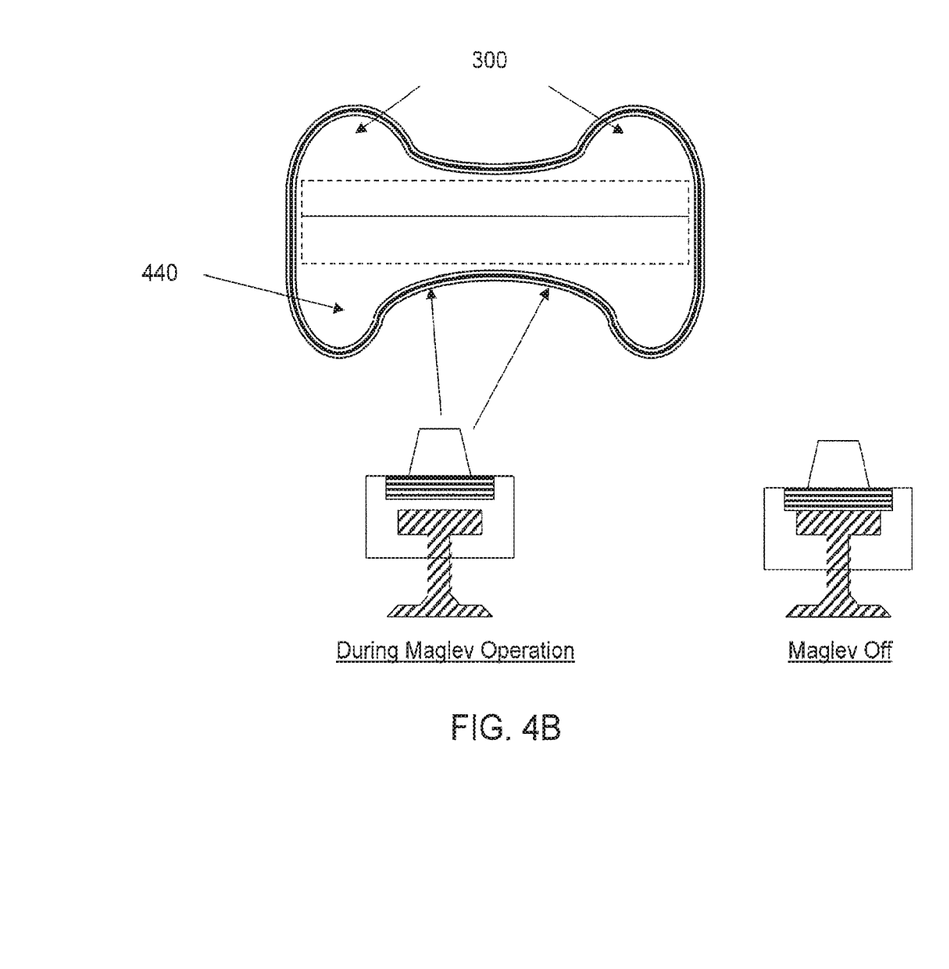
FIG. 4B is a is a cross section view of the emergency stopping system that uses aircraft grade braking material attached to the underside of the car in rubbing contact with an abrasion rail built into or depending from the tube or tunnel floor or lower wall.

FIG. 4B is a is a cross section view of the emergency stopping system that uses aircraft grade braking material attached to the underside of the car in rubbing contact with an abrasion rail built into or depending from the tube or tunnel floor or lower wall. When the levitation forces are removed, the pads on the undersurface of the train and act as aircraft brake pads to dissipate the kinetic energy of the train through friction with the low-speed track. Due to the high kinetic energy involved, aircraft style brake pads are preferred to deal with the extreme temperatures generated by friction. The pads can be sized to survive the most severe cases anticipated. After each emergency stop these pads will require inspection and replacement as necessary.

Sealing Structures for Sweeping the Tube ("Roughing Pump")

Figure 5A:
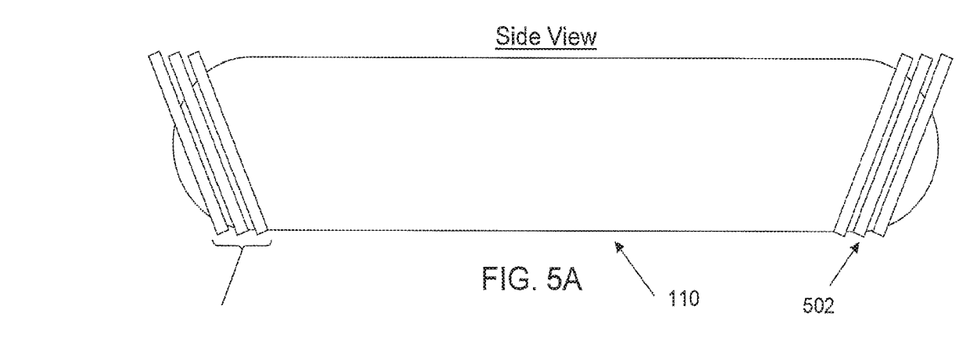
FIGS. 5A and 5B are side and cross-sectional views of the sealing structures on the train.
Figure 5B:
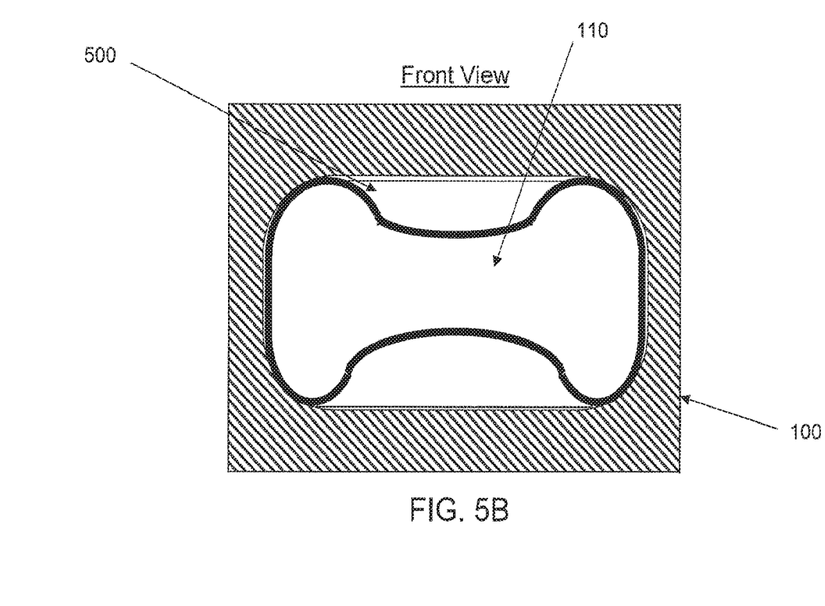
Figures 6A, 6B:
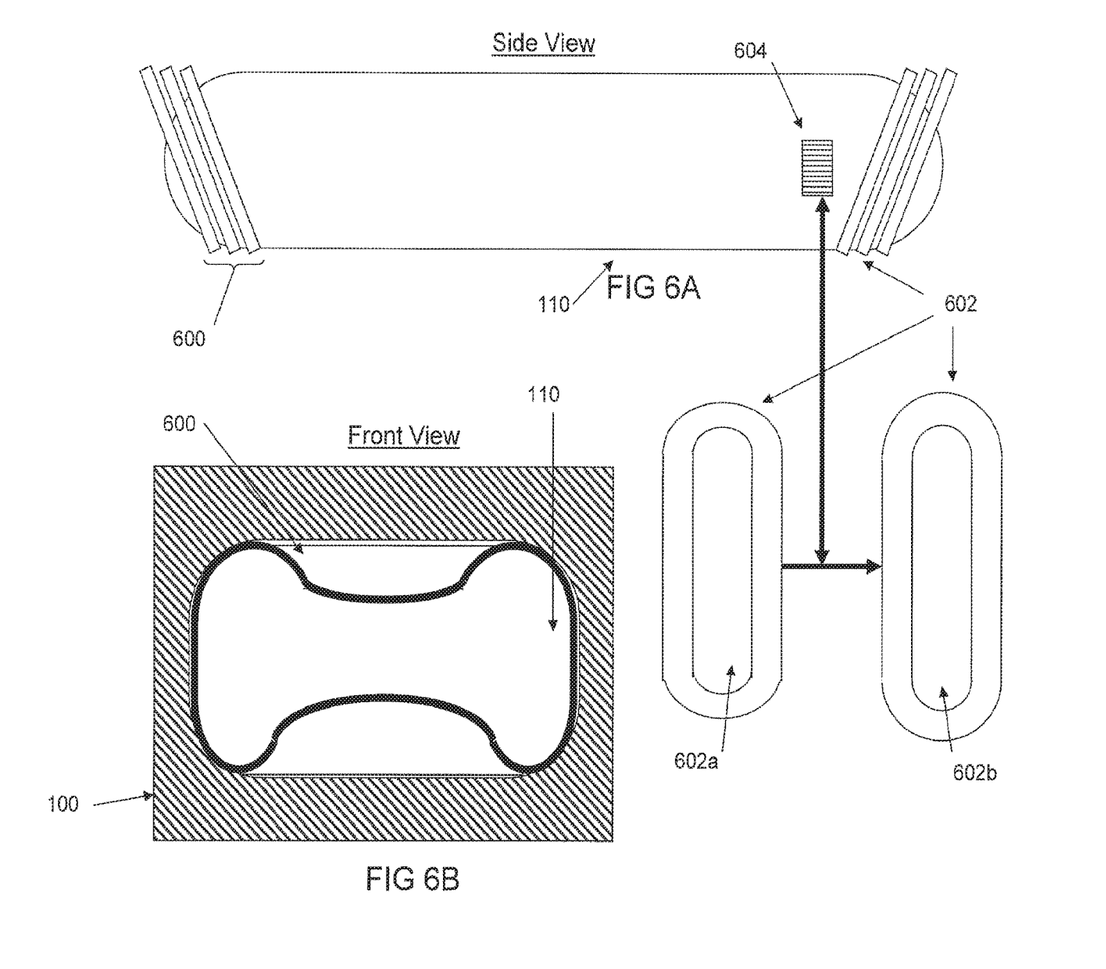
FIGS. 6A and 6B are side and front views of active sealing structures on the train.

FIGS. 5A and 5B are side and cross-sectional views of passive sealing structures 500 on the train in an embodiment of the present invention. FIGS. 6A and 6B are side and front views of active sealing structures 600 on the train. Sweeps such as these have advantages in their ability to be used to clear gas from the tube and their design in ability to provide a true seal when exposed to normal atmospheric pressure, and generally represent the preferred embodiment. Suitable materials include high-temperature urethane rubber and stiff silicone rubber.

Preferred embodiments dispose sealing structures 500 or 600 on the front and rear of each car 110; these sealing structures act when there is a gas such as air in the tube to prevent the passage of such a gas around the car and permit the car's motion to sweep the gas in the direction of its motion. By moving slowly at full gas pressure and by the use of multiple such cars all possessing the structures 500 or 600, the entire tunnel or any portion thereof may be swept free of this gas or "roughed out." Thus these cars with seal serve as roughing pump elements in an overall vacuum system. As shown in FIGS. 5A and 5B, the sealing elements 502 are passive in their relation with the gap between the car and wall fixed and necessary so as to permit the operation of the car at its maximal design speed without destructively interacting with the tube wall or magnetic levitation structure.

In FIGS. 6A and 6B, the sealing elements 602 are active and can be made to come very close or even contact the tube and magnetic levitation structure walls. A car may have both sealing elements 502 and 602 along its length. Furthermore it is well understood that by using groups of cars the effective sealing is the sum of the sealing by each car. In particular in the preferred embodiment, sealing element 602 is inflatable from the car air supply and air/vacuum pump system 604 so that at less than local ambient air pressure, element 602a conforms to the dimensions of passive element 502 and does not contact the wall, at ambient air pressure, 602b is in sealing contact with the tube wall and at pressures up to two atmospheres additional compliance to wall and resistance to displacement or motion is obtained.

Seals can be used to position the car off the floor of the tube and any direct contact with the linear motor and levitation structures. Furthermore variable seal structure thicknesses and materials across the seal can accommodate special tube requirements or the very small separation between the magnetic levitation and acceleration elements of the car and tunnel/tube.

Energy Storage and Exchange

Figure 7:
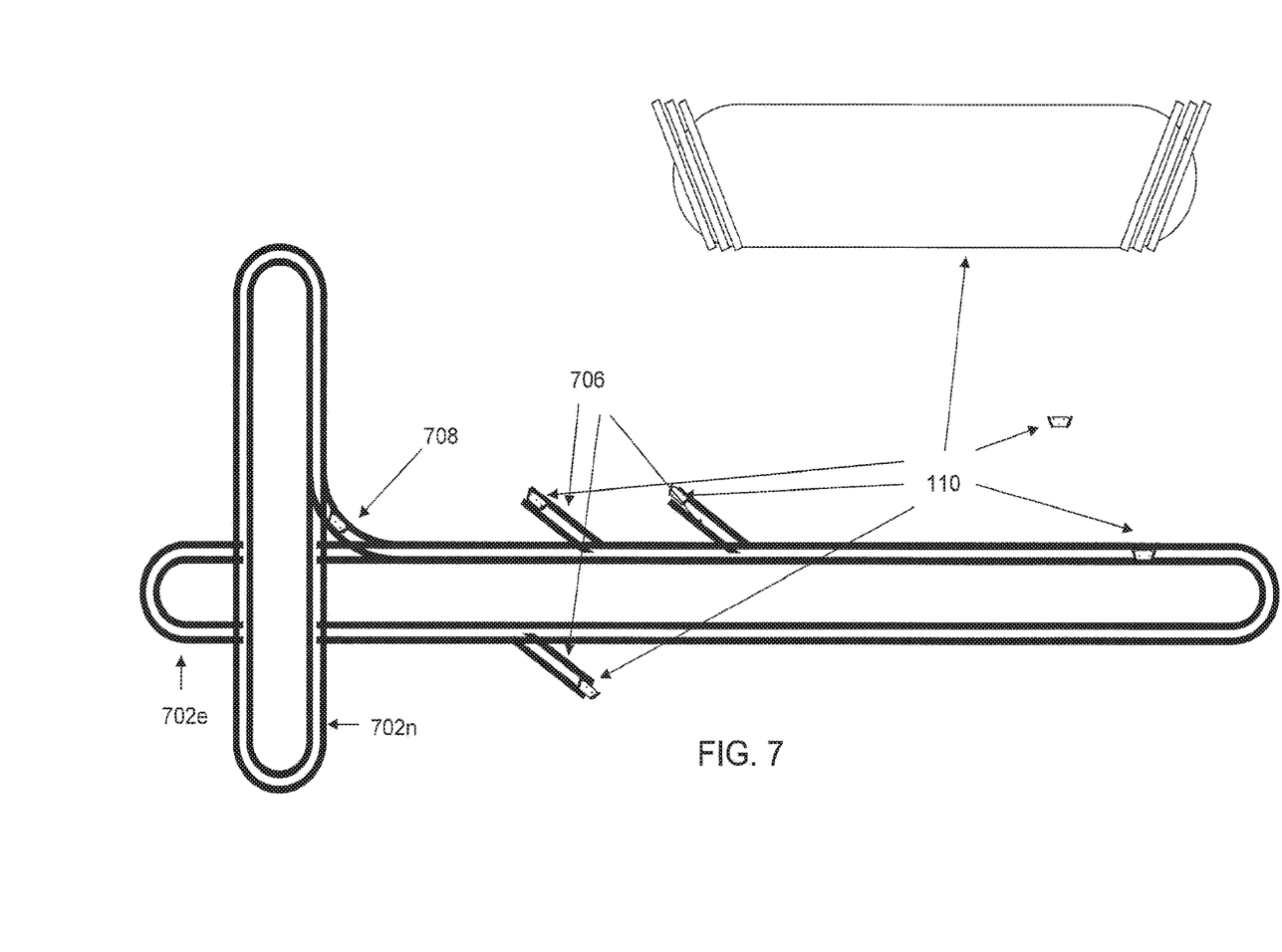
FIG. 7 is a top schematic view of the energy storage and warehouse trains in the complete system.

FIG. 7 is a top schematic view of the energy storage and warehouse train cars in the complete system that can take advantage of great velocity and mass of the train cars to store electrical energy and to transport it, exchange it or transfer it from one electrical system to another. As shown in FIG. 7, the system consists of one or more tube/tunnel configurations such that cars 704 can be kept in motion at all times. Each car with its load and given velocity has the following kinetic energy $Ke=(mv^2)/2$, where Ke is the kinetic energy in joules (watt-seconds), m is the mass in kg, v is the velocity in meters/sec.

At 1000 kph an empty car (20×10×100 meters) at 1000 metric tons has a $Ke=10^9$ joules or $10^3$ megawatt-seconds, which is the energy that is output by an entire major power plant for one second and of course multiple such cars can be so discharged (so to speak) or charged (accelerated up to speed).

A half full car (some material about the mass and weight of water like frozen food) has a mass of 20,000 metric tons or $2 \times 10^4$ megawatt-seconds (divide by 3600 for megawatt-hours) so 180 such cars represent the full output of a major power plant for one hour. Thus the system can provide and deliver via its distribution network an instantaneous supply equal to that of a full 1000-megawatt power plant filling an instantaneous power role presently not available. Without any passengers such storage cars can be accelerated and decelerated very rapidly perhaps at more then 10 g's, thus only short acceleration/deceleration tube/tunnel segments 706 are required and can double as stations.

Furthermore each such energy storage car is also a potential warehouse car carrying goods and/or materials whose availability is time critical at localities all along the route for instance emergency supplies in time of war or specific material for a dispersed manufacturing sector all able to save substantial money by not warehousing material but leveraging extremely short delivery to gain manufacturing cost advantages.

Thus even in a world where the system described herein was readily available as the low cost and most rapid shipper, a car full of goods nearby could easily beat the system by many minutes if not hours. So taking off a car for delivery in Los Angeles might mean simultaneously launching another moving warehouse on a nearly straight energy exchange. The cars also represent a means for exchanging energy across superconducting power systems. As an example a car can be transferred from an east/west system 702e to a north/south system 702n or between any independent system and the power represented by the car in motion on the system to which it was transferred thus adding and subtracting stored power from one grid to another.

Sealing Structures for Sealing the Tube

Figure 8A:
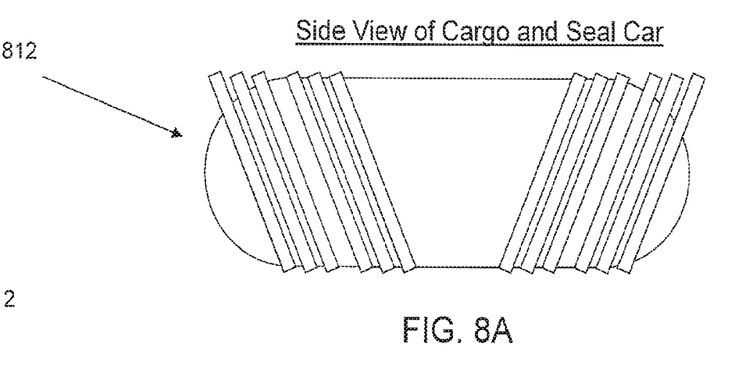
FIGS. 8A and 8B are side views of side and front loading train car with another auxiliary car sealing the main tube/tunnel.
Figure 8B:
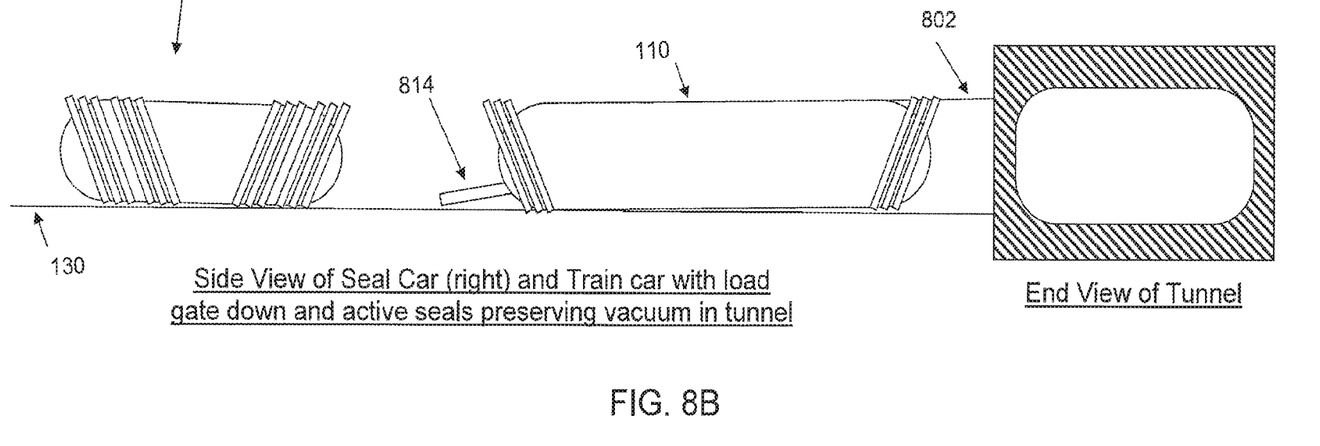

FIGS. 8A and 8B are side views of side and front loading train car with another auxiliary car sealing the main tube/tunnel. Groups of cars and in particular cars with active sealing elements may be situated anywhere in the tunnels and be stopped (being either levitated or completely stopped and resting on the tunnel) and their seals deployed to seal off a section of tunnel which may then be filled with a gas such as air. Further this method as in FIGS. 8A and 8B of sealing is well suited to creating a loading zone in which one or more cars are loaded by dropping their end doors 814 to permit ingress and egress of cargo, people and vehicles.

Such tube stations 802 are very desirable since they can be readily made by the same tunnel boring machines that create the vacuum tunnel or (for above ground 804, underwater 808, on water 810 regions shown in FIG. 1B) the tube forming method for such prefab tube components. Special cars 812 can act to use the linear motor and seal system, perform at very large accelerations for power storage, special materials storage and transfer, and act as airlock doors with common components and controls.

Capitalization via Right of Way

Figure 9:
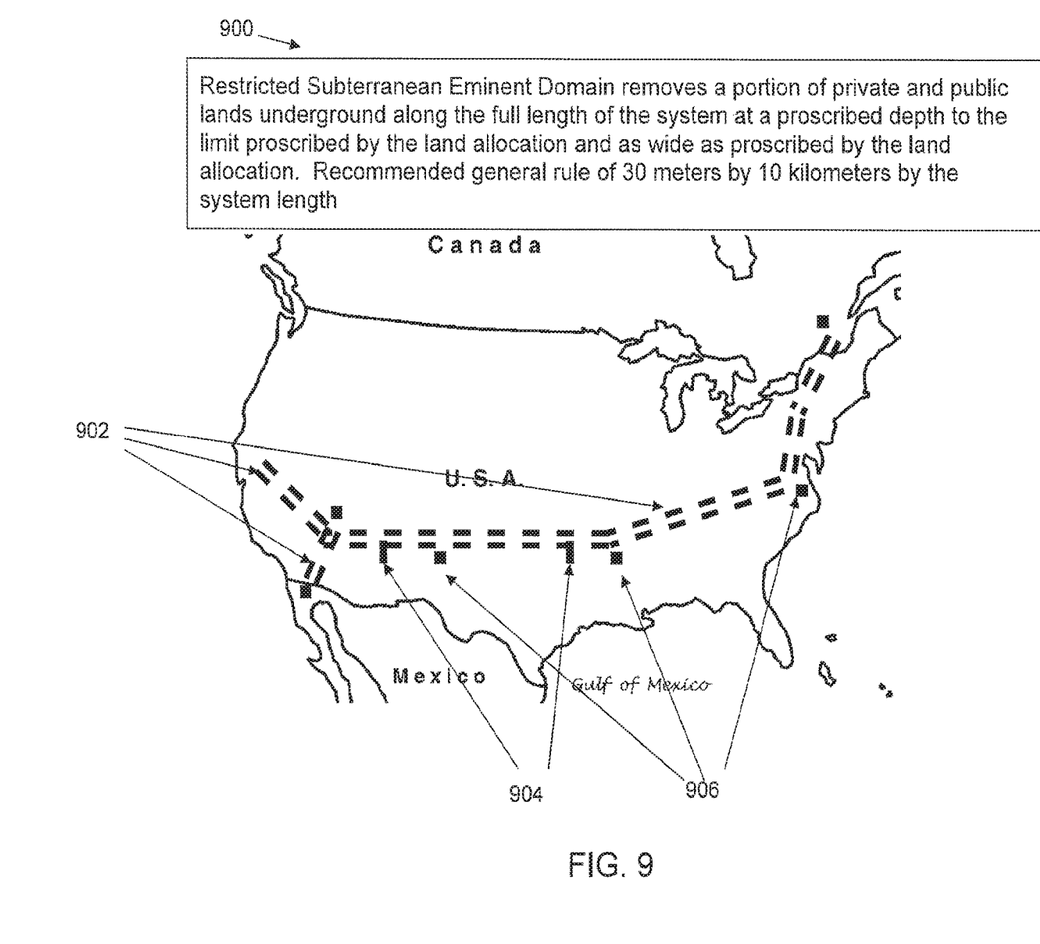
FIG. 9 is a is an overview of the right of way allocated to the capital entities funding the project along with a detail of a station and above-ground 1-square-kilometer reserve associated with the right of way.

FIG. 9 provides an overview of a mechanism for funding the development of a system as shown and described above. Undertaking the implementation of the technology described herein would likely be the largest capital project ever undertaken. Set forth here is a framework for providing long-term and short-term incentives.

A block 900 represents schematically a legal mandate (e.g., statute, judicial decision, executive order, or a combination) to implement a form of restricted eminent domain for limited subterranean rights, preferably without impeding any existing mineral, water, or surface rights in the overlying land. It is believed that such a mechanism can provide incentives for investors to fund such a massive undertaking.

Entities willing to spend the many billions of dollars needed to build the tunnels would be granted rights to a subterranean volume 902 adjacent the tunnel. The grant would include provision for multiple additional tunnels or tunnel enlargements 904. The grant could also include grants of surface plots (e.g., a square kilometer surface station plot every 100-200 miles) to provide surface access stations 906. These station areas will benefit from the subsequent growth of transport hubs, manufacturing, and cities around these "stations" 906. This grant provides the long term incentive, akin to that offered to the railroad companies in the 1870's to build the transcontinental railroad, which was extensive ownership of the land around the railroad. In that case, a successful railroad project added tremendous value to the land provided with each mile of road completed.

In order to encourage the investors in such a project, short term advantages (e.g., tax and carbon trading incentives stemming from the non-polluting nature of the technology and its compatibility with alternative energy sources) would likely also be provided.

CONCLUSION

While the above is a complete description of specific embodiments of the invention, the above description should not be taken as limiting the scope of the invention as defined by the claims.

What is claimed is:

1. A system comprising:
   a tube infrastructure that includes one or more tubular structures disposed along a path;
   a transport subsystem, disposed within the tube infrastructure, that includes a magnetic levitation mechanism for supporting and moving one or more magnetic levitation cars within at least one of the one or more tubular structures; and
   an electric power distribution subsystem, disposed within the tube infrastructure, that distributes electrical power to locations along the path, and that also provides power to the transport subsystem's magnetic levitation mechanism, the electric power distribution subsystem including one or more electrical transmission lines;

wherein the tube infrastructure is shared between the transport subsystem and the electric power distribution subsystem, wherein the one or more cars have an active seal system of seal structures disposed on the outside thereof such that each of the seal structures is not in contact with a wall of the tubular structure when an interior of the seal structure is at less than a local ambient air pressure, each of the seal structures is in contact with the wall of the tubular structure when the interior of the seal structure is at the local ambient air pressure, and each of the seal structures is in closer compliant contact with the wall of the tubular structure when the seal interior is above ambient air pressure.

2. The system of claim 1 wherein:
the electric power distribution subsystem gives rise to associated magnetic fields; and
the associated magnetic fields electrical power are also used by the transport subsystem.

3. The system of claim 1 wherein one or more train cars store energy in the form of kinetic energy.

4. The system of claim 1 wherein:
one or more cars are provided with linear motors; and
at least some kinetic energy of a given car having a linear motor is returned to the electric power distribution subsystem as electrical energy in a process of regenerative braking using that car's linear motor.

5. The system of claim 1 wherein one or more cars are operational in a closed tunnel or tube associated with the tube infrastructure.

6. The system of claim 1 wherein:
the electrical transmission lines include one or more superconducting elements;
air is removed from one or more of the tubular structures to
obtain a low air pressure and reduce or eliminate air friction in connection with moving one or more cars,
improve the electrical isolation of electrically charged system elements, and
provide thermal isolation to maintain a constant temperature around the electrical transmission lines and any superconducting elements thereof.

7. The system of claim 1 wherein:
air is reintroduced into one or more of the tubular structures from which air had been removed; and
the reintroduction of air into one or more of the tubular structures from which air had been removed can by itself cause one or more moving cars to come to a near complete stop.

8. The system of claim 1 wherein:
one or more cars is provided with one or more passive sealing members; and
one or more of the passive sealing members cause the motion of the car to move and compress gas and/or air in the direction of the motion, and create a partial vacuum in the opposite direction.

9. The system of claim 1 wherein:
one or more cars is provided with one or more active sealing members; and
one or more of the active sealing members cause the motion of the car to move and compress gas and/or air in the direction of the motion, and create a partial vacuum in the opposite direction.

10. The system of claim 1 wherein:
at least one car is provided with one or more active sealing members;

at least one car is provided with one or more passive sealing members; and
one or more of the active and passive sealing members cause the motion of the car to move and compress gas and/or air in the direction of the motion, and create a partial vacuum in the opposite direction.

11. The system of claim 1 wherein:
at least one car is provided with one or more active sealing members;
at least one car is provided with one or more passive sealing members; and
one or more of the active and passive sealing members seal against the tube or tunnel on one or more given cars at rest, referred to as sealing cars, and provide a region in the tube or tunnel in which air may be introduced and loading/unloading operations take place without permitting air to enter the tube/tunnel regions beyond the at rest sealing cars.

12. The system of claim 1, and further comprising an active seal system in which a gas is introduced at varying pressures to obtain close sealing or contact and compliant sealing with adjacent walls.

13. The system of claim 1, and further comprising an emergency support and braking system employing brake pads that contact a low-speed rail to support and decelerate the car in the event of failure of the magnetic levitation mechanism.

14. The system of claim 1 wherein:
the tube infrastructure includes a closed-loop tubular structure;
at least one of the cars is provided with a linear motor;
the at least one car is movable within the closed-loop tubular structure such that the at least one car can be maintained in continuous motion within the closed-loop tubular structure, thereby storing power in the form of kinetic energy of the at least one car; and
when the at least one car is slowed or stopped, the linear motor operates as a generator to convert at least some of the kinetic energy of the at least one car to electrical energy.

15. The system of claim 14 wherein the at least one of the cars is adapted to carry cargo.

16. The system of claim 14 wherein the tube infrastructure includes at least a first closed-loop tubular structure and a second closed-loop tubular structure connected to each other such that the at least one of the cars is transferable between the first closed-loop tubular structure and the second closed-loop tubular structure.

17. The system of claim 12 wherein the gas is air.

18. The system of claim 1 wherein two of the cars are positioned such that a space between the two cars provides a sealed-off section of the tubular structure when the two cars are stopped.

19. The system of claim 18 wherein the sealed-off section is filled with air to create a loading zone.

20. The system of claim 7 wherein one or more cars has an airflow surface along a long axis of the car and wherein, when air is reintroduced into one or more of the tubular structures while the car is moving at high speed, the airflow surface causes the car to behave as an airfoil.

21. The system of claim 20 wherein the one or more cars is also provided with one or more air sweeps to provide lift under low pressure and wherein, when air is reintroduced into one or more of the tubular structures while the car is moving at high speed, the one or more air sweeps break away from the one or more cars.

* * * * *